United States Patent
Yoo et al.

(10) Patent No.: US 11,485,866 B2
(45) Date of Patent: *Nov. 1, 2022

(54) FILM-PRINTABLE UV-CURABLE INK COMPOSITION, METHOD FOR PRODUCING BEZEL PATTERN USING SAME, BEZEL PATTERN PRODUCED BY SAME, AND FOLDABLE DISPLAY SUBSTRATE COMPRISING SAME

(71) Applicant: LG Chem, Ltd., Seoul (KR)

(72) Inventors: Jaehyun Yoo, Daejeon (KR); Hyeok Jeong, Daejeon (KR)

(73) Assignee: LG Chem, Ltd.

( * ) Notice: Subject to any disclaimer, the term of this patent is extended or adjusted under 35 U.S.C. 154(b) by 311 days.

This patent is subject to a terminal disclaimer.

(21) Appl. No.: 16/757,935

(22) PCT Filed: Aug. 13, 2019

(86) PCT No.: PCT/KR2019/010323
§ 371 (c)(1),
(2) Date: Apr. 21, 2020

(87) PCT Pub. No.: WO2020/036420
PCT Pub. Date: Feb. 20, 2020

(65) Prior Publication Data
US 2021/0079239 A1 Mar. 18, 2021

(30) Foreign Application Priority Data
Aug. 17, 2018 (KR) .................. 10-2018-0095805

(51) Int. Cl.
| | | |
|---|---|---|
| *C09D 11/101* | (2014.01) | |
| *B41M 7/00* | (2006.01) | |
| *C09D 11/326* | (2014.01) | |
| *C09D 11/36* | (2014.01) | |
| *C09D 11/38* | (2014.01) | |
| *C09D 11/54* | (2014.01) | |
| *G06F 1/18* | (2006.01) | |
| *G09F 9/30* | (2006.01) | |

(52) U.S. Cl.
CPC ......... *C09D 11/101* (2013.01); *B41M 7/0081* (2013.01); *C09D 11/326* (2013.01); *C09D 11/36* (2013.01); *C09D 11/38* (2013.01); *C09D 11/54* (2013.01); *G06F 1/181* (2013.01); *G09F 9/301* (2013.01)

(58) Field of Classification Search
CPC ....... C09D 11/101; C09D 11/30; C09D 11/36; C09D 11/326; C09D 11/54; C09D 11/38; C09D 11/322; C09D 11/037; C09D 11/033; C09D 11/324; B41M 7/0081; B41M 5/0023; G06F 1/181; G09F 9/301
See application file for complete search history.

(56) References Cited

U.S. PATENT DOCUMENTS

| | | |
|---|---|---|
| 2012/0147109 A1 | 6/2012 | Ohnishi |
| 2016/0020852 A1 | 1/2016 | Bato et al. |
| 2017/0198157 A1 | 7/2017 | Park et al. |
| 2017/0218212 A1* | 8/2017 | Park ................. C09D 171/00 |
| 2017/0227844 A1 | 8/2017 | Park et al. |
| 2017/0298241 A1 | 10/2017 | Park et al. |
| 2019/0039394 A1 | 2/2019 | Yoo et al. |
| 2019/0106540 A1 | 4/2019 | Mizuta et al. |
| 2019/0119443 A1 | 4/2019 | Mizuta et al. |
| 2019/0264051 A1 | 8/2019 | Yoo et al. |

FOREIGN PATENT DOCUMENTS

| | | | | |
|---|---|---|---|---|
| EP | 3162830 A1 | 5/2017 | | |
| JP | 2004182933 A | 7/2004 | | |
| JP | 2010235640 A | 10/2010 | | |
| JP | 2016021722 A | 2/2016 | | |
| JP | 2016027122 A | 2/2016 | | |
| JP | 2016199034 A | 12/2016 | | |
| KR | 20120046266 A | 5/2012 | | |
| KR | 20160037123 A | 4/2016 | | |
| KR | 20160147535 A | 12/2016 | | |
| KR | 20170011782 A | 2/2017 | | |
| KR | 2018039556 A * | 4/2018 | ............. | C08G 59/18 |
| KR | 20180039556 A | 4/2018 | | |
| TW | 201802649 A | 1/2018 | | |
| TW | 201823384 A | 7/2018 | | |
| WO | 2018070654 A1 | 4/2018 | | |
| WO | 2018111043 A1 | 6/2018 | | |

OTHER PUBLICATIONS

International Search Report for Application No. PCT/KR2019/010323, dated Dec. 4, 2019, pp. 1-2.
Search Report from Taiwanese Office Action for Application No. 108129110 dated Mar. 13, 2020; 1 page.

* cited by examiner

*Primary Examiner* — Jannelle M Lebron
(74) *Attorney, Agent, or Firm* — Lerner, David, Littenberg, Krumholz & Mentlik, LLP

(57) ABSTRACT

A film-printable UV-curable ink composition, a method for forming a bezel pattern using the same, a bezel pattern, and a display substrate comprising the bezel pattern are disclosed herein. In some embodiments, the ink composition includes a black pigment, a dispersant, an alicyclic epoxy compound, an oxetane compound, an acrylic or silicone surfactant, an organic solvent having a boiling point of 200° C. or more, a photosensitizer, a photopolymerization initiator and an adhesion promoter, wherein a weight ratio of the epoxy compound to the oxetane compound is 1:3 to 1:5. The bezel pattern produced by the ink composition is thin and yet has excellent light-shielding properties so as to prevent a panel pattern of a foldable display, such as a mobile device, from being visible and light leakage from occurring.

20 Claims, No Drawings

FILM-PRINTABLE UV-CURABLE INK COMPOSITION, METHOD FOR PRODUCING BEZEL PATTERN USING SAME, BEZEL PATTERN PRODUCED BY SAME, AND FOLDABLE DISPLAY SUBSTRATE COMPRISING SAME

CROSS-REFERENCE TO RELATED APPLICATION(S)

The present application is a national phase entry under 35 U.S.C. § 371 of International Application No. PCT/KR2019/010323, filed on Aug. 13, 2019, which claims priority from Korean Patent Application No. 10-2018-0095805, filed on Aug. 17, 2018, the disclosures of which are incorporated by reference herein.

BACKGROUND OF THE INVENTION

1. Field of the Invention

The present invention relates to a film printable ultraviolet curable ink composition, a method for producing a bezel pattern using the same, a bezel pattern manufactured thereby, and a foldable display substrate comprising the same.

2. Description of the Related Art

The flexible display market is evolving from flat and curved products to foldable products that can be folded and unfolded freely. Like other display devices, the foldable display devices require a bezel pattern which give colors and in which the pattern in non-display area of panel is not visually recognized. Mobile devices are close to human eyes because of their characteristics, and therefore, bezels with high light-shielding characteristics should be formed to prevent light leakage and recognition of panel patterns. If the bezel is thick, there is a problem that the bezel step is visually recognized on the screen and bubbles are not released when an optically clear adhesive (OCA) is attached. For this reason, a bezel pattern with low thickness and excellent light-shielding characteristics is required. However, a high amount of light of 5,000 mJ/cm$^2$ or more is required in order to cure high light-shielding black ink after 1 layer printing. The bezel pattern must be formed on various film layers such as cover window films or polarizing films. In case of a film having low heat resistance, deformation occurs and, at a low amount of light without causing film deformation, for example, at an amount of light of 2,000 mJ/cm$^2$ or less, surface wrinkles are generated, thereby lowering light-shielding property and adhesion of the bezel. Accordingly, there is a need for an ink composition and a printing process to prevent deformation and surface wrinkle generation even in a film having low heat resistance.

PRIOR ART DOCUMENT

[Patent Document]
(Patent Document 1) KR 10-2016-0147535 A

SUMMARY OF THE INVENTION

An object of the present invention is to provide a film printable ultraviolet curable ink composition which enables to form a bezel pattern having a low thickness and excellent light shielding properties such that a panel pattern of a foldable display device such as a mobile device is not visually recognized and light leakage is not occurred and there are no film deformation and no surface wrinkles for various films such as a cover window film or a polarizing film on which a bezel pattern is formed, a method for producing a bezel pattern using the same, a bezel pattern manufactured thereby, and a foldable display substrate comprising the same.

In order to achieve the above object, the present invention provides an ultraviolet curable ink composition for forming a bezel pattern of a foldable display substrate, comprising a black pigment, a dispersant, an alicyclic epoxy compound, an oxetane compound, an acrylic or silicone surfactant, an organic solvent having a boiling point of 200° C. or more, a photopolymerization initiator and an adhesion promoter, wherein a weight ratio of the epoxy compound to the oxetane compound is 1:3 to 1:5.

In addition, the present invention provides a bezel pattern manufactured by UV curing of the ultraviolet curable ink composition.

In addition, the present invention provides a method for producing a bezel pattern of a foldable display substrate, comprising:
a) inkjet printing a primary layer of the ultraviolet curable ink composition on a substrate in the shape of a bezel pattern;
b) UV curing the primary layer;
c) inkjet printing a secondary layer of the ultraviolet curable ink composition on the primary layer; and
d) UV curing the secondary layer to form the bezel pattern,
wherein the UV curing dose of steps b) and d) is 100 to 5,000 mJ/cm$^2$,
wherein the primary layer after performing the step a) has a thickness of 1 to 2.5 μm and an OD value of 2 to 2.5, and
wherein the bezel pattern after performing the step d) has a thickness of 2 to 5 μm and an OD value of 4 to 5.

In addition, the present invention provides a bezel pattern manufactured according to the method for producing a bezel pattern.

In addition, the present invention provides a display substrate comprising the bezel pattern.

Effect of the Invention

According to the film printable ultraviolet curable ink composition according to the present invention and the method for manufacturing a bezel pattern for a foldable display substrate by 2 layer printing using the above ink composition, in 1 layer printing, there is no film deformation even when cured with a low UV dose (<2,000 mJ/cm$^2$) and there are no surface wrinkles occurred due to low light-shielding characteristics (OD<2.5), and in 2 layer printing, light-shielding characteristics are excellent at low thickness, so that there is no problem of pattern visibility and step visibility of panels and no bubble generation after OCA attachment, and bezel characteristics (folding, adhesion, and pattern) are excellent.

DETAILED DESCRIPTION OF THE INVENTION

Hereinafter, the present invention will be described in more detail.

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The present invention provides an ultraviolet curable ink composition for forming a bezel pattern of a foldable display substrate, comprising a black pigment, a dispersant, an alicyclic epoxy compound, an oxetane compound, an acrylic or silicone surfactant, an organic solvent having a boiling point of 200° C. or more, a photopolymerization initiator and an adhesion promoter, wherein a weight ratio of the epoxy compound to the oxetane compound is 1:3 to 1:5.

The ultraviolet curable ink composition comprises a black pigment as a colorant.

In one embodiment of the present invention, carbon black, graphite, metal oxides, organic black pigments and the like can be used as the black pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); diagram black II, diagram black N339, diagram black SH, diagram black H, diagram LH, diagram HA, diagram SF, diagram N550M, diagram M, diagram E, diagram G, diagram R, diagram N760M, diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 (Degussa Co., Ltd.); RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, RAVEN-1170 (Columbia Carbon Co.), mixtures thereof, or the like.

The organic black pigment includes carbon black, lactam black, perylene black, and the like, but is not limited thereto.

The content of the black pigment is 5 to 20% by weight, or 10 to 20% by weight based on the total weight of the ultraviolet curable ink composition. If the content of the black pigment is less than 5% by weight, a level of optical density (OD) applicable to the bezel pattern may not be obtained. If it exceeds 25% by weight, the viscosity of the ink may become too high or an excessive amount of the black ink may not be dispersed in the ink, so that precipitates may be formed.

The ultraviolet curable ink composition comprises a dispersant.

The dispersant is used to make the black pigment into particles of uniform size and to shorten the production time of the ink. The dispersant may be a polymeric, nonionic, anionic or cationic dispersant, and examples thereof include acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts and alkylamines; and the like, which may be used alone or in combination of two or more thereof. It is preferable to use an acrylic dispersant having excellent ink storage property.

The content of the dispersant is 0.5 to 5% by weight, or 2 to 4% by weight, or about 3% by weight based on the total ink composition. If the content of the dispersant is less than 0.5% by weight based on the total weight of the ink composition, the pigment may not be uniformly distributed. If it exceeds 5% by weight, the pigment may aggregate or the curing sensitivity may decrease.

The ultraviolet curable ink composition comprises an alicyclic epoxy compound.

The alicyclic epoxy compound is a cationic polymerizable compound and may be one or a mixture of two selected from alicyclic epoxy compounds containing a cationic polymerizable alicyclic epoxy monomer. Such an alicyclic epoxy compound may contain one or two epoxidized aliphatic ring groups. The epoxidized aliphatic ring group may be a compound having an epoxy group bonded to an alicyclic ring, and a hydrogen atom of the alicyclic ring may be substituted with a substituent such as an alkyl group.

The alicyclic epoxy compound, i.e., the epoxy compound includes, but is not limited to, dicyclopentadiene dioxide, limonene dioxide, (3,4-epoxycyclohexyl)methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester and (3,4-epoxycyclohexyl)ethyltrimethoxysilane.

The content of the alicyclic epoxy compound may be 3 to 25% by weight, or 5 to 15% by weight, or about 10% by weight based on the total weight of the ink composition. If the content of the epoxy compound is less than 3% by weight based on the total ink composition, curing sensitivity may decrease. If it exceeds 25% by weight, the viscosity of the ink composition may increase to deteriorate inkjet processability.

The ultraviolet curable ink composition comprises an oxetane compound as another cationic polymerizable monomer.

The oxetane compound is a compound having a 4-membered cyclic ether group in its molecular structure, and is used to reduce the viscosity of the cationic polymerizable ink composition. Examples thereof include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane and phenol novolak oxetane and commercially available products thereof include "ARON OXETANE OXT-101", "ARON OXETANE OXT-121", "ARON OXETANE OXT-211", "ARON OXETANE OXT-221", "ARON OXETANE OXT-212" and the like from Toagosei Co., Ltd. These may be used alone or in combination of two or more.

The content of the oxetane compound is 25 to 50% by weight, or 30 to 45% by weight, or 32 to 40% by weight based on the total weight of the ink composition. If the content of the oxetane compound is less than 25% by weight based on the total ink composition, the viscosity of the ink composition may increase to deteriorate inkjet processability. If it exceeds 50% by weight, curing sensitivity may decrease.

In addition, the weight ratio of the alicyclic epoxy compound to the oxetane compound in the composition according to the present invention may be 1:2.5 to 1:6, in another embodiment 1:3 to 1:5 or 1:3 to 1:4. If the ratio of the epoxy compound to the oxetane compound exceeds 1:6, coating property of the composition may be excellent due to low viscosity of the composition, but strength and curing sensitivity of the coating film may be lowered. If the ratio is less than 1:2.5, coating property may be degraded due to high viscosity of the composition and surface wrinkles may be occurred in the coating film after UV curing.

The ultraviolet curable ink composition comprises a surfactant.

In order to perform 2 layer printing according to the present invention, spreadability of the ink should be excellent on the surface of the coating film cured after printing. Therefore, the surfactant is preferably an acrylic or silicone surfactant. With the acrylic or silicone surfactant, the ultraviolet curable ink composition according to the present invention can form a bezel pattern having excellent recoatability even without performing hydrophilic surface treatment (plasma, corona, UVO3, etc.).

As the acrylic or silicone surfactant, the commercial available product may be used. For example, it is selected form the group consisting of BYK-306, BYK-307, BYK-310, BYK-320, BYK-330, BYK-331, BYK-333, BYK-342, BYK-350, BYK-354, BYK-355, BYK-3550, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYK-UV 3530 and BYK-UV 3570 from BYK, or Rad 2100, Rad 2011, Glide 100, Glide 410, Glide 450, Flow 370, Flow 425 and Wet 500 from TEGO, etc.

The surfactant may be contained in an amount of 0.01 to 2.0 wt %, or 0.1 to 1.0 wt %, based on the total weight of the ultraviolet curable ink composition. If the content of the surfactant is less than 0.01% by weight, the effect of lowering the surface tension of the composition is not sufficient, so that coating failure occurs when the composition is coated on the substrate. If it exceeds 2.0% by weight, the surfactant is used in an excessive amount and there is a problem that the compatibility and anti-foaming of the composition is rather reduced.

The ultraviolet curable ink composition comprises an organic solvent.

The organic solvent is an essential component for the ink composition according to the present invention to maintain low thickness while exhibiting high light-shielding properties after curing. The organic solvent may be used without particular limitation as long as it has excellent curing sensitivity even after the bezel pattern is printed on the display substrate using the ink composition according to the present invention. However, in order to improve inkjet processability, it is preferable to use the organic solvent having a boiling point of 200° C. or more and a viscosity of 1 to 5 cP, or 1 to 3 cP at 25° C.

Thus, in case that the black pigment according to the present invention is contained in the total ink composition in a low content of less than 10% (especially 7% or less), there is no big problem in the inkjet processability even if an organic solvent such as ethylene glycol monobutylether acetate (BCsA) having a boiling point of less than 200° C. is used. However, if the black pigment is contained in a relatively high content of 10% or more, the inkjet processability is degraded.

Therefore, in the present invention, it is required to use an organic solvent which enables to enhance or improve the inkjet processability. The inkjet processability is improved as the use of an organic solvent satisfying the conditions of high boiling point and low viscosity as described above (a boiling point of 200° C. or higher and a viscosity of 1 to 5 cP, particularly 3 cP or less at 25° C.). Therefore, an organic solvent satisfying such conditions, for example, butyl diglyme (or diethylene glycol dibutyl ether), dipropylene glycol methyl ether acetate, ethylene glycol dibutyrate, diethyl succinate, gamma-butyrolactone (GBL) and ethyl caprate should be used, and it is preferable to use butyl diglyme and diethyl succinate.

The content of the organic solvent is 10 to 40% by weight, or 15 to 30% by weight, or 20 to 30% by weight, or 20 to 25% by weight based on the total weight of the ink composition. If the content of the organic solvent is less than 10% by weight, the viscosity of the ink may increase or the thickness of the bezel layer may become thick. If it exceeds 40% by weight, curing sensitivity may be lowered.

The ultraviolet curable ink composition comprises a photopolymerization initiator.

The photopolymerization initiator is a compound generating cationic species or Bronsted acid by irradiation with ultraviolet rays and, for example, it comprises an iodonium salt and a sulfonium salt, but it is not limited thereto.

The iodonium salt or the sulfonium salt may cause a curing reaction in which monomers having an unsaturated double bond contained in the ink are reacted to form a polymer during UV curing process, and a photosensitizer may be used depending on the polymerization efficiency.

For example, the photopolymerization initiator may include compounds having an anion represented by $SbF_6^-$, $AsF_6^-$, $BF_6^-$, $(C_6F_5)_4B^-$, $PF_6^-$ or $Rf_nF_{6-n}$, but is not necessarily limited thereto.

The photopolymerization initiator may be contained in an amount of 1 to 15% by weight, in another embodiment 1 to 10% by weight, or 2 to 10% by weight or 3 to 5% by weight based on the total weight of the ultraviolet curable ink composition. If the content of the photopolymerization initiator is less than 1% by weight, the curing reaction may be insufficient, and if it exceeds 15% by weight, it may not be completely dissolved or the viscosity may increase and the coatability may decrease.

The ultraviolet curable ink composition comprises a photopolymerization initiator solvent.

The photopolymerization initiator solvent may be used without limitation as long as it is a solvent capable of dissolving the initiator due to high solubility, and it is at least one selected from the group consisting of propylene carbonate, gamma butyrolactone (GBL), and N-ethyl pyrrolidone (NEP), but is not necessarily limited thereto.

The content of the photopolymerization initiator solvent may be 50 to 150% by weight, or 75 to 125% by weight based on the content of the photopolymerization initiator. If it is less than 50% by weight, the photopolymerization initiator may not be dissolved, so that precipitates may be formed. If it exceeds 150% by weight, curing sensitivity is lowered.

The ultraviolet curable ink composition comprises an adhesion promoter.

The adhesion promoter can improve adhesion between the substrate and the printed layer. The adhesion promoter may be at least one selected from the group consisting of an alkoxysilane compound and phosphate-based acrylate such as phosphate acrylate. Examples of the alkoxysilane compound include 3-glycidoxypropyl trimethoxysilane (KBM-403 (Shin-Etsu Chemical Co., Ltd., USA)), 3-glycidoxypropyl methyldimethoxysilane (KBM-402), 2-(3,4-epoxycyclohexyl)ethyltrimethoxysilane (KBM-303), 3-glycidoxypropyl methyldiethoxysilane (KBE-402), 3-glycidoxypropyl triethoxysilane (KBE-403), 3-methacryloxypropyl trimethoxysilane (KBM-503) and the like, which may be used alone or in combination of two or more.

In case that the adhesion promoter is used, the content thereof is 1 to 5% by weight, or 2 to 4% by weight based on the total weight of the ink composition. If the content of the adhesion promoter is less than 1% by weight, adhesion between the substrate and the printed layer may decrease. If it exceeds 5% by weight, curing sensitivity may be lowered and stability of the ink may decrease.

The ultraviolet curable ink composition may further comprise a photosensitizer in order to complement the curing property at the active energy ray having long wavelength.

The photosensitizer may be at least one selected from the group consisting of anthracene-based compounds such as anthracene, 9,10-dibutoxyanthracene, 9,10-dimethoxyanthracene, 9,10-diethoxyanthracene and 2-ethyl-9,10-dimethoxyanthracene; benzophenone-based compounds such as benzophenone, 4,4-bis(dimethylamino)benzophenone, 4,4-bis(diethylamino)benzophenone, 2,4,6-trimethylaminobenzophenone, methyl-o-benzoyl benzoate, 3,3-dimethyl-4-methoxybenzophenone and 3,3,4,4-tetra(t-butylperoxycarbonyl)benzophenone; ketone-based compound such as acetophenone, dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thioxanthone-based compounds such as thioxanthone, 2,4-diethyl thioxanthone, 2-chlorothioxanthone, 1-chloro-4-propyloxy thioxanthone, isopropylthioxanthone(ITX) and diisopropylthioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis (9-acridinyl)propane; dicarbonyl compounds such as 1,7,7-trimethyl-bicyclo[2,2,1]heptan-2,3-dione and 9,10-phenanthrenequinone; phosphine oxide-based compounds such as 2,4,6-trimethylbenzoyldiphenylphosphine oxide and bis(2,6-dimethoxybenzoyl)-2,4,4-trimethylpentylphosphine oxide; benzoate-based compounds such as methyl-4-(dimethylamino)benzoate, ethyl-4-(dimethylamino)benzoate and 2-n-butoxyethyl-4-(dimethylamino)benzoate; amino synergists such as 2,5-bis(4-diethylaminobenzal)cyclopentanone, 2,6-bis(4-diethylaminobenzal)cyclohexanone and 2,6-bis(4-diethylaminobenzal)-4-methyl-cyclopentanone; coumarine-based compounds such as 3,3-carbonylvinyl-7-(diethylamino)coumarine, 3-(2-benzothiazolyl)-7-(diethylamino) coumarine, 3-benzoyl-7-(diethylamino)coumarine, 3-benzoyl-7-methoxy-coumarine and 10,10-carbonylbis[1, 1,7,7-tetramethyl-2,3,6,7-tetrahydro-1H,5H,11H—C1]-bezopyrano[6,7,8-i,j]-quinolizin-11-one; chalcone compounds such as 4-diethylamino chalcone and 4-azidobenzalacetophenone; 2-benzoylmethylene-3-methyl-β-naphtothiazoline.

The content of the photosensitizer is 1 to 5% by weight, and in another embodiment 2 to 4% by weight based on the total weight of the ultraviolet curable ink composition. If the content of the photosensitizer is less than 1% by weight, a synergistic effect of curing sensitivity at a desired wavelength could not be expected. If it exceeds 5% by weight, the photosensitizer may not be dissolved and the adhesive strength and crosslinking density of the pattern may be lowered.

The ultraviolet curable ink composition (or ink) has a curing dose of 100 to 5,000 mJ/cm$^2$, or 200 to 3,000 mJ/cm$^2$ and is cured by absorbing radiation in the wavelength range of 250 to 410 nm, preferably 360 to 410 nm. Furthermore, in order to be suitable for an inkjet process, it has a viscosity of, for example, 1 to 30 cP at 25° C., or 2 to 20 cP at a process temperature. The adhesive force to the substrate without the post-process (heat treatment) is 4B or more or 5B or more in the cross cut test. With regard to folding properties, no crack occurs when folding 100,000 times at a folding radius of 2.5R after UV curing.

The ultraviolet curable ink composition forms a bezel pattern on a cover window film or a polarizing film layer. Even in a film having a low heat resistance, a pattern having high light-shielding property (e.g., OD>4) can be cured even with a low UV dose (e.g., <2,000 mJ/cm$^2$) without generation of surface wrinkles, thereby enabling UV curing without film deformation. In addition, due to excellent light-shielding characteristics at a low thickness, there are no problems of pattern visibility and step visibility of the panel and no bubble generation after OCA attachment. In addition, the folding (for example, folding radius 2.5R, 100,000 times or more) and the adhesion (for example, cross cut 5B) characteristics for application to the foldable device are excellent. The bezel pattern formed by UV curing of the ultraviolet curable ink composition according to the present invention may have, in one embodiment, a total thickness of 2 to 5 μm and an OD value of 4 to 5.

The top of the bezel pattern formed of the ultraviolet curable ink composition may be attached to an upper substrate through an adhesive layer for an upper substrate. The ultraviolet curable ink composition has excellent adhesive force with the adhesive for an upper substrate, such as an acrylic adhesive, a styrene butadiene rubber adhesive, an epoxy adhesive, a polyvinyl alcohol-based adhesive or polyurethane-based adhesive. With the ultraviolet curable ink composition, it can be obtained an effect of improving the adhesion between the bezel pattern and the upper substrate.

The method for producing a bezel pattern for a foldable display substrate according to the present invention uses the above ultraviolet curable ink composition.

In particular, the method for producing a bezel pattern for a foldable display substrate according to the present invention comprises the steps of a) inkjet printing a primary layer of the ultraviolet curable ink composition according to the present invention on a substrate in the shape of a bezel pattern; b) UV curing the primary layer; c) inkjet printing a secondary layer of the ultraviolet curable ink composition according to the present invention on the primary layer formed in step b); and d) UV curing the secondary layer to form a bezel pattern.

In the present invention, in order to prevent film deformation and surface wrinkle generation, the 2 layer printing process and the ultraviolet curable ink composition according to the present invention are applied.

According to the present invention, in 1 layer printing, the film is printed at a thickness of 2.5 μm or less and with an OD value of 2 or more and there is no film deformation even when cured with low UV dose and there are not surface wrinkles occurred due to low light-shielding characteristics (OD value below 2.5). In addition, in 2 layer printing, the film is printed at a thickness of 5 μm or less and with an OD value of 4 or more and the bezel pattern formed therefrom has excellent light shielding characteristics at low thickness, so that there are no problems of pattern visibility and step visibility of panels and no bubble generation after OCA attachment, and folding and adhesion characteristics for foldable devices are excellent.

In one embodiment of the present invention, the foldable display substrate may be a foldable display film.

In one embodiment of the present invention, the foldable display substrate may comprise a foldable display film.

In one embodiment of the present invention, the curing dose of step b) and step d) may be 100 to 5,000 mJ/cm$^2$ or 200 to 3,000 mJ/cm$^2$, the bezel pattern formed after the step a) may have a thickness of 1 to 2.5 μm and an OD value of 2 to 2.5, and the bezel pattern formed after the step d) may have a thickness of 2 to 5 μm and an OD value of 4 to 5.

In one embodiment of the present invention, the curing of steps b) and d) may be performed by absorbing ultraviolet radiation in the wavelength range of 360 nm to 410 nm.

In the present invention, the substrate of step a) may be various substrates such as film, glass, plastic, and the like, and may be, for example, a cover window film or a polarizing film.

In addition, the method for producing a bezel pattern for a display substrate of the present invention may further comprise a step of cleaning the film before the step a) of forming the bezel pattern. This is for selectively performing the surface treatment depending on the surface energy of the substrate to improve coating properties of the ink and to remove stains by foreign substances.

Specifically, the surface treatment may be performed by treatment of atmospheric pressure plasma, corona or the like.

The bezel pattern is characterized in that, as measured after curing, the taper angle is greater than 0° and 30° or less and the thickness is 0.1 to 20 μm. In addition, the taper angle may preferably be greater than 0° and 10° or less. In addition, the thickness may be preferably 0.5 to 5 μm. Since the bezel pattern of the present invention has the above characteristics, it may not exhibit short-circuit due to a large step, bubble generation, and deterioration of visual quality due to film release.

The optical density of the bezel pattern may be 4 to 5.5 on the basis of the film thickness of 4.0 μm, or it may be 4.5 to 5, if necessary. In this case, there is an advantage that the shielding properties by the bezel pattern are excellent. If the optical density exceeds 5.5, the required content of the pigment to be added becomes very high, which may adversely affect the production of the ink and the inkjet process and may inhibit the ultraviolet curable ink composition from being cured by radiation.

The present invention provides a bezel pattern for a foldable display substrate manufactured by the above method. In the present invention, the bezel pattern refers to a pattern formed at the edges of various devices such as a watch, a display device, and the like.

In one embodiment of the present invention, the foldable display substrate may be a foldable display film.

In one embodiment of the present invention, the foldable display substrate may comprise a foldable display film.

The bezel pattern is characterized in that, as measured after curing, the taper angle is greater than 0° and 30° or less and the thickness is 0.1 to 20 μm. In addition, the taper angle may preferably be greater than 0° and 10° or less. In addition, the thickness may be preferably 0.5 to 5 μm. Since the bezel pattern of the present invention has the above characteristics, it may not exhibit short-circuit due to a large step, bubble generation, and deterioration of visual quality due to film release.

The optical density of the bezel pattern may be 4 to 5.5 on the basis of the film thickness of 4.0 μm, or it may be 4.5 to 5, if necessary. In this case, there is an advantage that the shielding properties by the bezel pattern are excellent. If the optical density exceeds 5.5, the required content of the pigment to be added becomes very high, which may adversely affect the production of the ink and the inkjet process and may inhibit the ultraviolet curable ink composition from being cured by radiation.

In addition, the present invention provides a foldable display substrate comprising the bezel pattern.

The foldable display substrate may be a foldable display film.

The foldable display substrate may comprise a foldable display film.

The display substrate may be used for an organic light emitting diode (OLED).

Hereinafter, preferred examples are provided to help understanding of the present invention. However, it will be apparent to those skilled in the art that various modifications and variations can be made in the present invention without departing from the spirit or scope of the invention as set forth in the appended claims. Such changes and modifications are intended to be within the scope of the appended claims.

EXAMPLES

[Example 1] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 36 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ultraviolet curable ink composition of the present invention.

[Example 2] Preparation of Ultraviolet Curable Ink Composition

As shown in the following Table 1, pigment dispersion (18 parts by weight of carbon black, 3 parts by weight of a dispersant, 25 parts by weight of diethyl succinate), 10 parts by weight of Celloxide 2021P, 34.5 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ultraviolet curable ink composition of the present invention.

[Example 3] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 35 parts by weight of Oxetane 221, 2 parts by weight of an adhesion promoter (KBM-403), 6 parts by weight of a photopolymerization initiator (Speedcure 992), 2 part by weight of a photosensitizer (DBA) and 0.5 part by weight of a surfactant (Flow 370) were mixed with stirring for 6 hours to prepare an ultraviolet curable ink composition of the present invention.

[Example 4] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 33 parts by weight of Oxetane 221, 2 parts by weight of an adhesion promoter (KBM-403), 8 parts by weight of a photopolymerization initiator (Speedcure 992), 2 part by weight of a photosensitizer (DBA) and 0.5 part by weight of a surfactant (Flow 370) were mixed with stirring for 6 hours to prepare an ultraviolet curable ink composition of the present invention.

[Example 5] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 39 parts by weight of Oxetane 221, 2 parts by weight of an adhesion promoter (KBM-403), 3 parts by weight of a photopolymerization initiator (Irgacure 290), 1 part by weight of a photosensitizer (DBA) and 0.5 part by weight of a surfactant (Flow 370) were mixed with stirring for 6 hours to prepare an ultraviolet curable ink composition of the present invention.

[Example 6] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 38 parts by weight of Oxetane 221, 2 parts by weight of an adhesion promoter (KBM-403), 4 parts by weight of a photopolymerization initiator (Irgacure 290), 1 part by weight of a photosensitizer (DBA) and 0.5 part by weight of a surfactant (Flow 370) were mixed with stirring for 6 hours to prepare an ultraviolet curable ink composition of the present invention.

[Example 7] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 36 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Wet 270) were mixed with stirring for 6 hours to prepare an ultraviolet curable ink composition of the present invention.

[Example 8] Preparation of Ultraviolet Curable Ink Composition

As shown in the following Table 1, pigment dispersion (16.5 parts by weight of carbon black, 3 parts by weight of a dispersant, 25 parts by weight of diethyl succinate), 10 parts by weight of Celloxide 2021P, 36 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (BYK-3550) were mixed with stirring for 6 hours to prepare an ultraviolet curable ink composition of the present invention.

[Comparative Example 1] Preparation of Ink Composition

As shown in the following Table 2, pigment dispersion (16.5 parts by weight of carbon black, 3 parts by weight of a dispersant, 25 parts by weight of diethyl succinate), 15 parts by weight of Celloxide 2021P, 31 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ink composition.

[Comparative Example 2] Preparation of Ink Composition

As shown in the following Table 2, pigment dispersion (16.5 parts by weight of carbon black, 3 parts by weight of a dispersant, 25 parts by weight of diethyl succinate), 10 parts by weight of Celloxide 2021P, 20 parts by weight of Oxetane 221, 16 parts by weight of neopentyl glycol diglycidyl ether, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ink composition.

[Comparative Example 3] Preparation of Ink Composition

As shown in the following Table 2, pigment dispersion (16.5 parts by weight of carbon black, 3 parts by weight of a dispersant, 25 parts by weight of diethyl succinate), 10 parts by weight of Celloxide 2021P, 36 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (F-554) were mixed with stirring for 6 hours to prepare an ink composition.

[Comparative Example 4] Preparation of Ink Composition

As shown in the following Table 2, pigment dispersion (16.5 parts by weight of carbon black, 3 parts by weight of a dispersant, 25 parts by weight of diethyl succinate), 10 parts by weight of Celloxide 2021P, 38 parts by weight of Oxetane 221, 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ink composition.

[Comparative Example 5] Preparation of Ink Composition

As shown in the following Table 2, pigment dispersion (16.5 parts by weight of carbon black, 3 parts by weight of a dispersant, 25 parts by weight of ethylene glycol monobutyl ether acetate), 10 parts by weight of Celloxide 2021P, 36 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ink composition.

[Comparative Example 6] Preparation of Ink Composition

As shown in the following Table 2, pigment dispersion (12 parts by weight of carbon black, 2 parts by weight of a dispersant, 25 parts by weight of diethyl succinate), 10 parts by weight of Celloxide 2021P, 41.5 parts by weight of Oxetane 221, 2 parts by weight of an adhesion promoter (KBM-403), 6 parts by weight of a photopolymerization initiator (Speedcure 992), 1 part by weight of a photosensitizer (DBA) and 0.5 part by weight of a surfactant (Flow 370) were mixed with stirring for 6 hours to prepare an ink composition.

(A) Pigment dispersion: Black ink dispersion, BK-5313 manufactured by Tokushiki (B) Alicyclic epoxy: Celloixde 2021P manufactured by Daicel (C) Monomer: OXT-221 manufactured by Toagosei, Neopentyl glycol diglycidyl ether (LD-203, manufactured by Kukdo chemical)

(D) Adhesion promoter: KBM-403 munufactured by Shin-Etsu (E) Photopolymerization initiator: Cationic polymeric initiator Speedcure 992 (PF6-, in Propylene carbonate 50%), manufactured by lambson), Irgacure 290 (BF6-, 100% solid, manufactured by IGM resin), Irgacure 250 (PF6-, in Propylene carbonate 25%, manufactured by IGM resin)

(F) Photosensitizer: DBA (9,10-Dibutoxyanthracene, manufactured by kawasaki, ANTHRACURE™ UVS-1331), ITX (isopropyl thioxanthone, manufactured by IHT)

(G) Surfactant: Flow 370 (Acrylics, manufactured by TEGO), Wet270 (Acrylics, manufactured by TEGO), BYK-3550 (Silicone-based, manufactured by BYK), F-554 (Fluorine-based, manufactured by DIC)

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| (A) | Carbon black | 16.5 | 18 | 16.5 | 16.5 | 16.5 | 16.5 | 16.5 | 16.5 |
| | Acrylic dispersant | 3 | 3 | 3 | 3 | 3 | 3 | 3 | 3 |
| | Diethyl succinate | 25 | 25 | 25 | 25 | 25 | 25 | 25 | 25 |
| | Ethylene glycol monobutyl ether acetate | | | | | | | | |
| (B) | Celloxide 2021P | 10 | 10 | 10 | 10 | 10 | 10 | 10 | 10 |
| (C) | OXT-221 | 36 | 34.5 | 35 | 33 | 39 | 39 | 36 | 36 |
| | Neopentyl glycol digylcicyl ether | | | | | | | | |
| (D) | KBM-403 | 2 | 2 | 2 | 2 | 2 | 2 | 2 | 2 |
| (E) | Speedcure 992 | 6 | 6 | 6 | 8 | | | 6 | 6 |
| | Irgacure 290 | | | | | 3 | | | |
| | Irgacure 250 | | | | | | 3 | | |
| (F) | DBA | 1 | 1 | 2 | 2 | 1 | | 1 | 1 |
| | ITX | | | | | | 1 | | |
| (G) | Flow 370 | 0.5 | 0.5 | 0.5 | 0.5 | 0.5 | 0.5 | | |
| | Wet 270 | | | | | | | 0.5 | |
| | BYK-3550 | | | | | | | | 0.5 |
| | F-554 | | | | | | | | |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| (A) | Carbon black | 16.5 | 16.5 | 16.5 | 16.5 | 16.5 | 12 |
| | Acrylic dispersant | 3 | 3 | 3 | 3 | 3 | 2 |
| | Diethyl succinate | 25 | 25 | 25 | 25 | | 25 |
| | Ethylene glycol monobutyl ether acetate | | | | | 25 | |
| (B) | Celloxide 2021P | 15 | 10 | 10 | 10 | 10 | 10 |
| (C) | OXT-221 | 31 | 20 | 36 | 38 | 36 | 41.5 |
| | Neopentyl glycol digylcicyl ether | | 16 | | | | |
| (D) | KBM-403 | 2 | 2 | 2 | | 2 | 2 |
| (E) | Speedcure 992 | 6 | 6 | 6 | 6 | 6 | 6 |
| | Irgacure 290 | | | | | | |
| | Irgacure 250 | | | | | | |
| (F) | DBA | 1 | 1 | 1 | 1 | 1 | 1 |
| | ITX | | | | | | |
| (G) | Flow 370 | 0.5 | 0.5 | | 0.5 | 0.5 | 0.5 |
| | Wet 270 | | | | | | |
| | BYK-3550 | | | | | | |
| | F-554 | | | 0.5 | | | |

[Examples 1 to 8 and Comparative Examples 1 to 6] Evaluation of Properties of Samples Prepared with Ink Compositions The ink compositions prepared in Examples 1 to 8 and Comparative Examples 1 to 6 were subjected to inkjet printing (1 layer printing) on a square TAC film having a size of 50 mm in width, 50 mm in length and 50 μm in thickness to have an optical density (OD, measured by X-rite 341C) of 2.5 and UV cured with a 395 nm UV LED lamp, and then were subjected to inkjet printing (2 layer printing) and UV cured with a 395 nm UV LED lamp to have an optical density of 2.5, thereby preparing a sample with optical density of 5. The thickness of the sample, curing sensitivity, adhesion, recoatability, surface wrinkle generation after curing, dynamic folding, inkjet processability, and bubble generation after OCA attachment were evaluated. The results are shown in Tables 3 and 4.

Here, the curing sensitivity was determined by using a UV LED lamp having a wavelength of 395 nm to detect UV energy at a tack free point. The recoatability was evaluated by visually confirming that ink can be applied without blank space when 2 layer printing after 1 layer printing and curing. The adhesion was evaluated as OB to 5B (Standard: ASTM D3002, D3359) through cross-cut test. The dynamic folding was evaluated by confirming the occurrence of cracks by folding 100,000 times at a folding radius of 2.5R using a film folding test machine (model: STS-VRT-5AXIS, Sciencetown). The inkjet processability was determined by jetting evaluation according to short pause (3 s) and idle time after wiping, with the ink being discharged from all nozzles. The surface wrinkles were evaluated by visually confirming whether the surface wrinkles are formed after UV curing. In addition, the bubble generation after OCA attachment was evaluated by confirming whether bubbles were generated at the bezel interface by a microscope after OCA lamination and autoclave treatement (50° C., 90 s). In the evaluation of surface wrinkles, recoatability and bubble generation after OCA attachment in Tables 3 and 4 below, OK sign means excellent, NG sign means not good.

TABLE 3

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Thickness (μm) | 4 | 3.6 | 4 | 4 | 4 | 4 | 4 | 4 |
| Optical density | 5 | 5 | 5 | 5 | 5 | 5 | 5 | 5 |
| Curing sensitivity after 1 layer printing (mJ/cm$^2$) | 1,500 | 1,500 | 1,500 | 1,500 | 1,500 | 1,500 | 1,500 | 1,500 |
| Surface wrinkles | OK | OK | OK | OK | OK | OK | OK | OK |
| Recoatability | OK | OK | OK | OK | OK | OK | OK | OK |
| Cross cut | 5B | 5B | 5B | 5B | 5B | 5B | 5B | 5B |
| Dynamic folding | >100K | >100K | >100K | >100K | >100K | >100K | >100K | >100K |
| Inkjet processability (idle time) | 10 min | 10 min | 10 min | 10 min | 10 min | 10 min | 10 min | 10 min |
| Bubble generation after OCA attachment | OK | OK | OK | OK | OK | OK | OK | OK |

TABLE 4

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Thickness (μm) | 4 | 4 | 4 | 4 | 4 | 6 |
| Optical density | 3 | 5 | 5 | 5 | 5 | 5 |
| Curing sensitivity after 1 layer printing (mJ/cm$^2$) | 1,500 | 3,000 | 1,500 | 1,500 | 1,500 | 1,500 |
| Surface wrinkles | NG | OK | OK | OK | OK | OK |
| Recoatability | | OK | NG | OK | OK | OK |
| Cross cut | 0B | 5B | — | 0B | 5B | 5B |
| Dynamic folding | NG | >100K | — | NG | >100K | >100K |
| Inkjet processability (idle time) | 10 min | 10 min | 10 min | 10 min | 3 min | 10 min |
| Bubble generation after OCA attachment | NG | OK | OK | OK | OK | NG |

As shown in Table 1 and Table 3, the ink compositions of Examples 1 to 8 showed excellent results in curing sensitivity after 1 layer printing, surface wrinkles, recoatability, adhesion, dynamic folding and inkjet processability. Specifically, in the ink composition of Example 1 which comprises 16.5% of carbon black and 25% of a solvent (diethyl succinate), the thickness is 4 µm at O.D. 5 and it is confirmed that it is an inkjet ink curable with a low UV dose (<2,000 mJ/cm$^2$) without film deformation. In the ink composition of Example 2 in which the content of carbon black in Example 1 is changed to 18%, the thickness is 3.6 µm at O.D. 5, there is no surface wrinkles generated and the recoatability for 2 layer printing is excellent. In the ink composition of Example 3 in which the content of photosensitizer DBA in Example 1 is increased from 1% by weight to 2% by weight, the bezel performance is excellent. In the ink composition of Example 4 in which the content of the photopolymerization initiator speedcure 992 in Example 3 is increased from 6% by weight to 8% by weight, the bezel performance is excellent. In the ink composition of Example 5 in which the photopolymerization initiator in Example 1 is changed to Irgacure 290, the bezel performance is excellent. In the ink composition of Example 6 in which the photopolymerization initiator in Example 1 is changed to Irgacure 250, the bezel performance is excellent. In the ink composition of Example 7 in which the surfactant in Example 1 is changed to Wet 270, the recoatability for 2 layer printing is excellent. In the ink composition of Example 8 in which the surfactant in Example 1 is changed to BYK-3550, the recoatability for 2 layer printing is excellent. In contrast, in the composition of Comparative Example 1 in which the content of alicyclic epoxy compound (Celloxide 2021P) in Example 1 is increased from 10% by weight to 15% by weight and the content of oxetane compound (OXT-221) in Example 1 is lowered from 36% by weight to 31% by weight, there are surface wrinkles generated and therefore the recoatability, adhesion and folding performance are not good. In addition, in the composition of Comparative Example 2 in which the content of oxetane compound (OXT-221) in Example 1 is lowered from 36% by weight to 20% by weight and glycidyl ether (LD-203, 16 wt %) is added, the curing sensitivity is not good (3,000 mJ/cm$^2$) and therefore film deformation is occurred. In the composition of Comparative Example 3 in which the surfactant in Example 1 is changed to the fluorine-based surfactant (F-554), the recoatability is not good. In the composition of Comparative Example 4 in which the adhesion promoter (KBM-403) in Example 1 is excluded, the adhesion has OB in the cross cut test and the folding performance is not good. In the composition of Comparative Example 5 in which the solvent in Example 1 is changed to ethylene glycol monobutyl ether acetate having a boiling point of 200° C. or less, the inkjet processability is not good. In the composition of Comparative Example 6 in which the content of carbon black in Example 1 is lowered (from 16.5% to 12%), the printed thickness is 6 µm when 2 layer printing at O.D level of 5, and the bubble does not disappear after OCA attachment even by autoclave treatment.

While the present invention has been particularly shown and described with reference to the particular embodiments thereof, it will be apparent to those skilled in the art that these specific descriptions are only preferred embodiments and that the scope of the invention is not limited thereby. Accordingly, the actual scope of the present invention will be defined by the appended claims and their equivalents.

What is claimed is:

1. An ultraviolet curable ink composition for forming a bezel pattern of a foldable display substrate, comprising:
   a black pigment, a dispersant, an alicyclic epoxy compound, an oxetane compound, an acrylic or silicone surfactant, an organic solvent having a boiling point of 200° C. or more, a photosensitizer, a photopolymerization initiator and an adhesion promoter,
   wherein a weight ratio of the epoxy compound to the oxetane compound is 1:3 to 1:5.

2. The ultraviolet curable ink composition according to claim 1, wherein the weight ratio of the alicyclic epoxy compound to the oxetane compound is 1:3 to 1:4.

3. The ultraviolet curable ink composition according to claim 1, wherein the black pigment is present in an amount of 5 to 20% by weight based on the total ink composition.

4. The ultraviolet curable ink composition according to claim 1, wherein the dispersant is present in an amount of 0.5 to 5% by weight based on the total weight of the ink composition.

5. The ultraviolet curable ink composition according to claim 1, wherein the alicyclic epoxy compound is present in an amount of 3 to 25% by weight based on the total weight of the ink composition.

6. The ultraviolet curable ink composition according to claim 1, wherein the oxetane compound is present in an amount of 25 to 50% by weight based on the total weight of the ink composition.

7. The ultraviolet curable ink composition according to claim 1, wherein the acrylic or silicone surfactant is present in an amount of 0.1 to 1.0% by weight based on the total weight of the ink composition.

8. The ultraviolet curable ink composition according to claim 1, wherein the organic solvent is present in an amount of 20 to 30% by weight based on the total weight of the ink composition.

9. The ultraviolet curable ink composition according to claim 1, wherein the photopolymerization initiator is present in an amount of 1 to 10% by weight based on the total weight of the ink composition.

10. The ultraviolet curable ink composition according to claim 1, wherein the adhesion promoter is present in an amount of 1 to 5% by weight based on the total weight of the ink composition.

11. The ultraviolet curable ink composition according to claim 1, wherein the black pigment is a carbon black pigment, a lactam black pigment, a perylene black pigment or a combination thereof.

12. The ultraviolet curable ink composition according to claim 1, wherein the organic solvent is selected from the group consisting of butyl diglyme, dipropylene glycol methyl ether acetate, ethylene glycol dibutyrate, diethyl succinate, gamma-butyrolactone, and ethyl caprate.

13. The ultraviolet curable ink composition according to claim 1, wherein the photopolymerization initiator comprises at least one of an iodonium salt and a sulfonium salt.

14. The ultraviolet curable ink composition according to claim 13, wherein the photopolymerization initiator comprises a sulfonium salt.

15. The ultraviolet curable ink composition according to claim 1, wherein the ultraviolet curable ink composition has a curing dose of 100 to 5,000 mJ/cm$^2$ and is cured by absorbing radiation in a wavelength range of 250 nm to 410 nm.

16. The ultraviolet curable ink composition according to claim 1, wherein the ultraviolet curable ink composition, after curing, has adhesive force to the substrate of 4B or more in a cross cut test according to ASTM D3002 or D3359, and no crack occurred after folding 100,000 times at a folding radius of 2.5R.

17. A method for producing a bezel pattern for a foldable display substrate, comprising:
   inkjet printing a primary layer of the ultraviolet curable ink composition according to claim 1 on a substrate in the shape of a bezel pattern;
   UV curing the primary layer;
   inkjet printing a secondary layer of the ultraviolet curable ink composition on the primary layer; and
   UV curing the secondary layer to form the bezel pattern,
   wherein the UV curing dose for the primary and secondary layers is 200 to 3,000 mJ/cm$^2$,
   wherein the primary layer has a thickness of 1 to 2.5 μm and an optical density (OD) value of 2 to 2.5, and
   wherein the bezel pattern has a thickness of 2 to 5 μm and an OD value of 4 to 5.

18. The method for producing a bezel pattern for a foldable display substrate according to claim 17, wherein the primary and secondary layers are cured by absorbing ultraviolet radiation in the wavelength range of 360 nm to 410 nm.

19. A foldable display substrate comprising a bezel pattern formed by UV curing of the ultraviolet curable ink composition according to claim 1.

20. The foldable display substrate according to claim 19, wherein the foldable display substrate comprises a foldable display film.

\* \* \* \* \*